US009127782B2

(12) United States Patent
Allain et al.

(10) Patent No.: US 9,127,782 B2
(45) Date of Patent: Sep. 8, 2015

(54) SINGLE USE MICROFLUIDIC VALVE

(75) Inventors: Marjolaine Allain, Domene (FR); Skandar Basrour, Grenoble (FR); Jean Berthier, Meylan (FR); Patrick Pouteau, Meylan (FR)

(73) Assignees: Commissariat a l'energie atomique et aux energies alternatives, Paris (FR); UNIVERSITE JOSEPH FOURIER, Grenoble (FR)

( * ) Notice: Subject to any disclaimer, the term of this patent is extended or adjusted under 35 U.S.C. 154(b) by 675 days.

(21) Appl. No.: 12/766,231

(22) Filed: Apr. 23, 2010

(65) Prior Publication Data
US 2010/0276005 A1  Nov. 4, 2010

(30) Foreign Application Priority Data

Apr. 30, 2009  (FR) ..................... 09 52859

(51) Int. Cl.
*F16K 99/00* (2006.01)
*B01L 3/00* (2006.01)

(52) U.S. Cl.
CPC ....... *F16K 99/0001* (2013.01); *B01L 3/502738* (2013.01); *F16K 99/00* (2013.01); *F16K 99/0044* (2013.01); *B01L 2400/0677* (2013.01); *F16K 2099/0084* (2013.01); *F16K 2099/0086* (2013.01); *Y10T 137/0318* (2015.04); *Y10T 137/1797* (2015.04)

(58) Field of Classification Search
CPC .............. F16K 99/0001; F16K 99/003; F16K 99/0044; F16K 2099/0086; F16K 2099/0084; B01L 3/502738; B01L 2400/0677; Y10T 137/0318; Y10T 137/1797
USPC ................ 137/67, 72, 74, 75; 604/6.1, 34, 604/99.01–99.04, 246–256
See application file for complete search history.

(56) References Cited

U.S. PATENT DOCUMENTS

| 5,797,898 | A | * | 8/1998 | Santini et al. | 604/890.1 |
|---|---|---|---|---|---|
| 5,965,410 | A | * | 10/1999 | Chow et al. | 435/91.2 |
| 6,114,658 | A | | 9/2000 | Roth et al. | |
| 6,875,208 | B2 | * | 4/2005 | Santini et al. | 604/890.1 |
| 7,175,772 | B2 | * | 2/2007 | Eldridge | 216/2 |
| 7,497,846 | B2 | * | 3/2009 | Uhland et al. | 604/173 |
| 7,589,008 | B2 | * | 9/2009 | Kirby | 438/612 |

(Continued)

FOREIGN PATENT DOCUMENTS

WO  WO 2007/120640 A2  10/2007

OTHER PUBLICATIONS

French Search Report issued Nov. 17, 2009, in Patent Application No. 0952859.

(Continued)

*Primary Examiner* — Kevin Murphy
*Assistant Examiner* — Daphne M Barry
(74) *Attorney, Agent, or Firm* — Oblon, McClelland, Maier & Neustadt, L.L.P.

(57) ABSTRACT

A microfluidic valve including a microchannel, a membrane arranged so as to seal off the microchannel and equipped with resistive units, characterized in that at least one face of the membrane includes at least one groove, and in that the resistive units are arranged in the groove and are capable, when an electric control current flows through them, of expanding sufficiently under the effect of the heat produced by the flow of the electric current to cause the rupture of at least one part of the membrane.

12 Claims, 4 Drawing Sheets

(56) References Cited

U.S. PATENT DOCUMENTS

| | | | |
|---|---|---|---|
| 8,095,197 B2* | 1/2012 | Santini et al. | 600/347 |
| 2002/0187260 A1* | 12/2002 | Sheppard et al. | 427/248.1 |
| 2003/0019522 A1* | 1/2003 | Parunak | 137/251.1 |
| 2004/0024382 A1 | 2/2004 | Cho et al. | |
| 2008/0173354 A1* | 7/2008 | Debray | 137/74 |
| 2010/0063485 A1* | 3/2010 | Johnson et al. | 604/890.1 |
| 2014/0001116 A1 | 1/2014 | Berthier et al. | |
| 2014/0037515 A1 | 2/2014 | Charles et al. | |

OTHER PUBLICATIONS

European Search Report issued Jul. 28, 2010, in Patent Application No. 10 16 1194.

D. J. Laser, et al., "A review of micropumps", Journal of Micromechanics and Microengineering, vol. 14, 2004, pp. R35-R64.

* cited by examiner

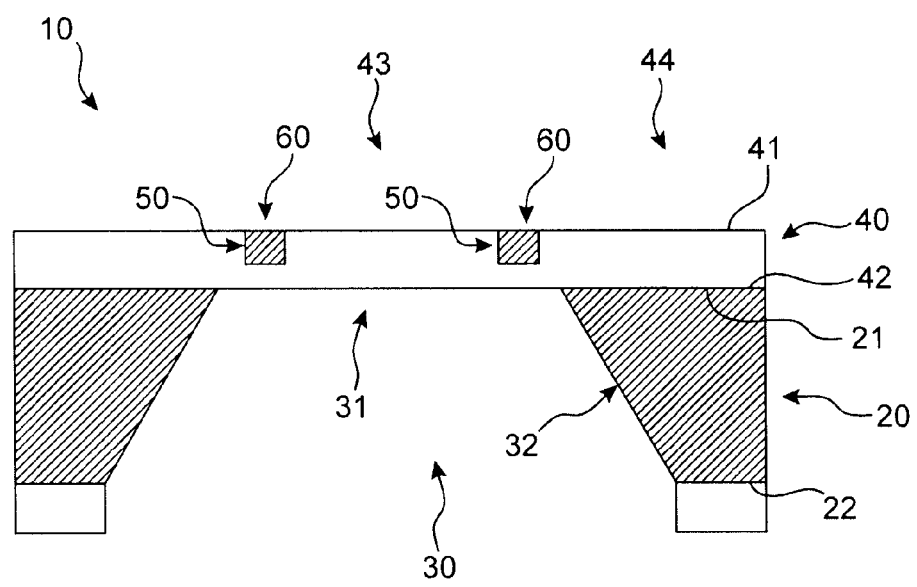
FIG.2
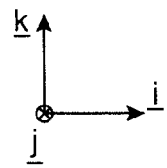

SINGLE USE MICROFLUIDIC VALVE

TECHNICAL FIELD

The present invention relates to the general field of microfluidics and concerns a single use microfluidic valve for what are known as "continuous" microfluidics. "Continuous" microfluidics relates to the flow of a fluid in continuous phase, and is the opposite of "discrete" microfluidics in which drops are manipulated and displaced.

The invention applies to any microfluidic device enabling the flow of a fluid in a microchannel for the purpose of biochemical, chemical or biological analyses, whether in the medical field, or in environmental surveillance, or in the field of quality control.

STATE OF THE PRIOR ART

Microfluidic valves, or microvalves, make it possible to block or allow the flow of a fluid in a microchannel and are frequently used in microfluidic devices.

For example, microvalves may be present in lab-on-chips or medical substance injection systems.

The opening and the closing of the microvalves may be achieved in different ways, for example, by means of a piezoelectric, electrostatic, thermopneumatic, or even electromagnetic actuator. The article of Laser and Santiago entitled "A review of micropumps", J. Micromech. Microeng., 14 (2004), R35-R64, discloses examples of microvalves used in micropumps.

Certain microvalves may be single use, in other words they are designed to go just once from the closed configuration to the open configuration. Once open, these microvalves remain definitively in this configuration.

International application WO 2007/120640 describes an example of single use microvalve used to seal off the microchannel of a microfluidic device.

The microvalve is in part illustrated in FIGS. 1A and 1B. FIG. 1A is a top and perspective view of a membrane on which extends an electrical track. FIG. 1B is a sectional view along the axis I-I of the membrane represented in FIG. 1A.

The microvalve 10 comprises a substrate 20 in which a microchannel 30 is formed which opens out onto the upper surface 21 of said substrate 20.

A thermally deformable membrane 40 is deposited on the upper surface 21 of said substrate 20 and seals off one end of said microchannel 30.

An electrical track 60 is fixed directly to the surface 41 of the membrane 40 opposite to the microchannel 30, and extends, for example, in zigzag pattern.

The terminals of the electrical track are connected to a voltage generator (not represented).

When the voltage generator is activated, an electric current flows through the electrical track 60. This causes a temperature increase in the electrical track 60 and is accompanied by a release of heat through Joule effect.

A part of the heat is transmitted through conduction from the electrical track 60 to the membrane 40, which brings about a local increase in the temperature of the membrane.

The membrane 40 then has a non uniform temperature field, the maximum value of which is localised at the level of the contact surface between the membrane 40 and the electrical track 60.

The temperature decreases on moving further away from said contact surface, particularly along the thickness dimension of the membrane.

The expansion of the membrane 40 is directly correlated to the induced temperature field. Mechanical stresses, essentially shear stresses, are then generated which cause the rupture of the membrane.

The opening of the microvalve 10 is then obtained, which allows a fluid to flow into the microchannel 30.

This microvalve has however a certain number of drawbacks.

The opening of the microvalve cannot be obtained in a reproducible manner. Table 4 of the international application cited previously illustrates this problem. According to this table, in the case of an electrical track made of gold, the rupture of the membrane is not obtained systematically, despite the high amount of electrical energy supplied, of the order of several hundreds of millijoules.

The reason may be that the intensity of the mechanical stresses generated has not been sufficient. One solution may then consist in raising the electrical energy supplied to the electrical track. However, other problems may then arise, such as the melting of the electrical track before the rupture of the membrane.

The necessary electrical energy remains however high. It is also of the order of several hundreds of millijoules in the case of an electrical track made of platinum, as is shown by the same table 4 of the international application cited previously.

Furthermore, a risk of disbondment of the electrical track from the surface of the membrane exists. Indeed, the electrical track and the membrane are made of different materials, and have substantially different coefficients of thermal expansion. Also, the difference of expansion between these two materials induces, at the level of said contact surface, particularly high shear stresses. Said stresses may weaken the fixation by adherence of the electrical track on the membrane, and can cause the overall or partial disbondment of the electrical track from the surface of the membrane. The disbondment, when it occurs before the rupture of the membrane, renders the microvalve inoperable.

DESCRIPTION OF THE INVENTION

The main aim of the invention is to present a microfluidic valve for microfluidic device making it possible to overcome at least partly the above mentioned drawbacks relative to the embodiment of the prior art with reference to FIGS. 1A and 1B.

To do this, the object of the invention is a microfluidic valve comprising a microchannel, a membrane arranged so as to seal off said microchannel and equipped with resistive means.

According to the invention, at least one face of said membrane comprises at least one groove, said resistive means being arranged in said groove and are capable, when an electric control current flows through them, of expanding sufficiently under the effect of the heat produced by the flow of said electric current to cause the rupture of at least one part of said membrane.

Thus, unlike the microfluidic valve according to the embodiment of the prior art cited previously, a groove is formed on one of the faces of the membrane. Said groove brings about a local geometric modification of the membrane.

In addition, the resistive means do not have the sole function of heating up under the effect of an electric current that flows through them, but also and above all to expand sufficiently.

In expanding, the resistive means exert stresses on a part of the surface of the groove, which thereby generates mechanical stresses in the membrane.

Due to the local geometric modification of the membrane at the level of the groove, the mechanical stresses tend to naturally concentrate in the area of the groove. The groove thus forms a predetermined area of weakness, favourable to rupture.

The rupture of the membrane is then obtained for lower intensity stresses than in the embodiment of the prior art cited previously. Furthermore, the place of the rupture of the membrane is controlled and corresponds substantially to the area of the groove.

The electrical energy to be supplied is also less high. The risks of melting of the material of the resistive means and of disbondment of said resistive means are thus reduced or even avoided.

Advantageously, said groove comprises two lateral faces substantially opposite to each other, delimiting a width of groove and connected to each other by a lower face, said resistive means being in at least partial contact with said lateral faces and said lower face.

The resistive means, when they expand, exert mechanical stresses, particularly tangential stresses, on the lower face and normal stresses on the lateral faces. Shear and compressive stresses are then generated in the membrane. As explained previously, these mechanical stresses tend to concentrate in the area of the groove and cause the rupture of the membrane.

In addition, the fact that the resistive means are in contact with the lateral faces, and thus "confined" between them, contributes to avoiding the phenomenon of disbondment.

According to the preferred embodiment of the invention, the microfluidic valve comprises means for generating an electric control current connected to said resistive means. These generation means may be a voltage generator connected to the resistive means by electric wires and connection pads.

Alternatively, said means for generating electric current are generation means by electromagnetic induction and comprise a coil connected to said resistive means. The coil may comprise one or more loops the size of which is between several micrometeres and several millimeters. The coil is subjected to a pulsed magnetic or electromagnetic field for the time necessary for the opening of the microfluidic valve.

Advantageously, said resistive means are made of a material having a first coefficient of thermal expansion and in that said membrane is made of a material having a second coefficient of thermal expansion substantially less than that of said first coefficient of thermal expansion.

Preferably, said groove has an average depth between 0.2 and 0.8 times the average thickness of said membrane.

Preferably, said resistive means are made of a material chosen among gold, platinum, aluminium, manganese, zinc, nickel, inconel 600, chromium, copper and polysilicon.

Preferably, said membrane is made of a material chosen among $Si_3N_4$, $SiO_2$, and SiN.

Said face of the membrane comprising said groove is, preferably, opposite to said microchannel. Thus, in the case where the microchannel is filled with a conductive fluid, any phenomenon of short circuit is avoided.

The invention also relates to a microfluidic device comprising a microfluidic valve according to any of the preceding characteristics, a reservoir of fluid being connected to said microchannel.

Furthermore, a second microchannel, or a cavity or chamber, may be connect to said microchannel and separated from it by said membrane.

The first microchannel may be filled with a fluid, if necessary under pressure. The second microchannel may be under vacuum. Thus, during the opening of the microfluidic valve by rupture of the membrane, the fluid flows into the second microchannel under the effect of the pressure difference.

The invention also relates to a method for opening a microfluidic valve according to any of the preceding characteristics, wherein an electrical energy substantially less than $10^{-4}$ J is supplied to said resistive means.

Other advantages and characteristics of the invention will appear in the detailed non-limiting description below.

BRIEF DESCRIPTION OF DRAWINGS

Embodiments of the invention will now be described by way of non limiting examples and by referring to the appended drawings, among which:

FIG. 2 is a transversal sectional view of a part of microfluidic valve according to the preferred embodiment of the invention;

DETAILED DESCRIPTION OF A PREFERRED EMBODIMENT

Figure 1A:
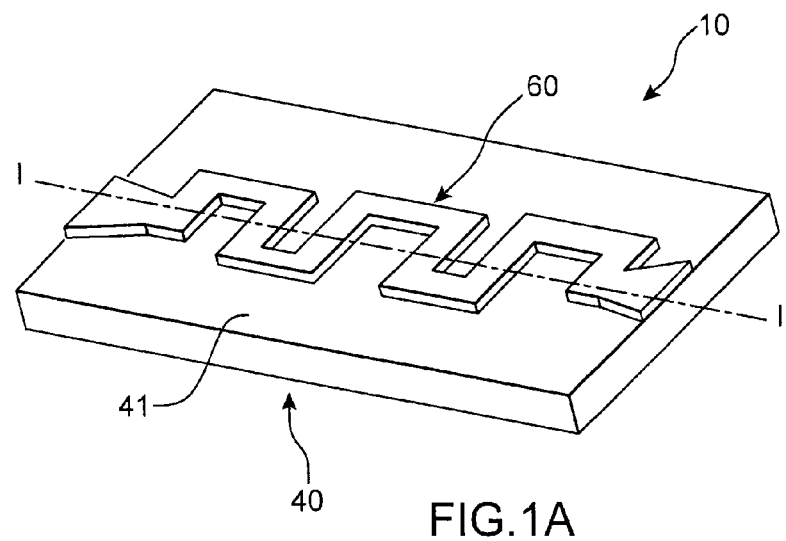
FIG. 1A, already described, is a top and perspective view of a part of a microfluidic valve according to an embodiment of the prior art comprising a membrane on which extends an electrical track.
Figure 1B:
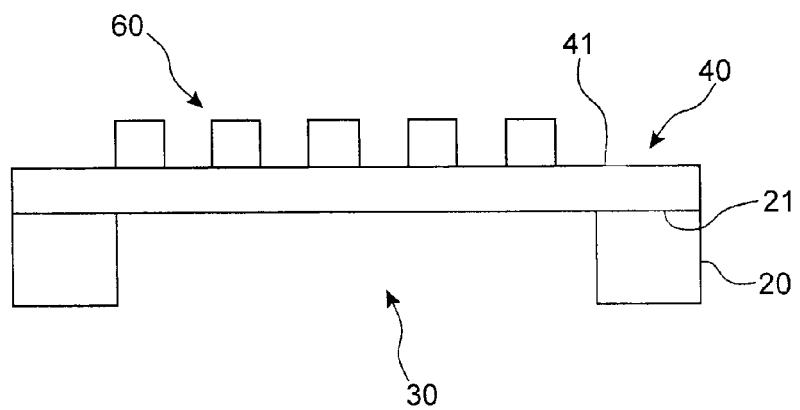
FIG. 1B, already described, is a transversal sectional view along the axis I-I of the part of microfluidic valve represented in FIG. 1A.

FIG. 2 illustrates, in transversal section, a microfluidic valve 10 according to the preferred embodiment of the invention.

It should be noted that scales are not respected, in order to make the drawing clearer.

Throughout the description that follows, an orthonormal coordinate (i,j,k) is used, represented in particular in FIG. 2.

The microfluidic valve 10 comprises a substrate 20 in which is formed a traversing microchannel 30.

The microchannel 30 opens out onto an upper face 21 of the substrate 20.

The terms "lower" and "upper" are here to be understood in terms of orientation along the direction k of the orthonormal coordinate (i,j,k) represented in FIG. 2.

The microfluidic valve 10 comprises a membrane 40 arranged on the upper face 21 of the substrate 20 so as to seal off the microchannel 30.

Membrane is taken to mean a thin film.

The average thickness of the membrane 40, measured along the direction k, is substantially less than the dimensions of the surface of the membrane that extends in a plane substantially parallel to the plane (i,j).

The membrane 40 is integral with the substrate 20. More specifically, the membrane has a lower face 42, a part of which is fixed to the upper face 21 of the substrate 20.

Also, the membrane 40 has a central part 43 situated opposite the microchannel 30 so as to seal it off, and a peripheral part 44, the lower face of which 42 is fixed to the substrate 20.

The membrane 40 is substantially rigid, but may also be supple or flexible.

The membrane 40 may be made of a material that has a high Young's modulus E, for example of the order of several tens to several hundreds of gigapascals. Also, a small deformation of the membrane generates mechanical stresses of high intensity.

Furthermore, the deformation regime of the material of the membrane may not comprise a plastic domain but essentially an elastic domain. The material is then known as brittle, in contrast with ductile materials. Also, the rupture of the membrane may be obtained for small deformations, in the elastic domain.

In the preferred embodiment of the invention, the upper face 41 of the membrane 40 comprises a groove 50.

Figure 3:
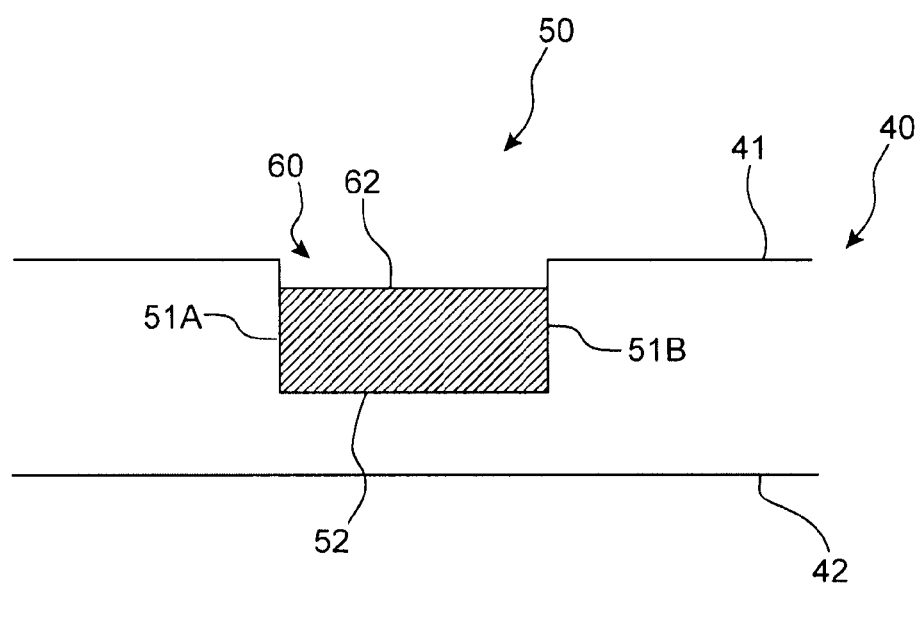
FIG. 3 is an enlarged view of a groove as represented in transversal section in FIG. 2.
Figure 3:
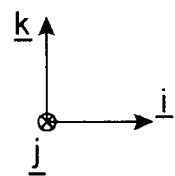

FIG. 3 is an enlarged view of a groove represented in transversal section in FIG. 2.

Groove is taken to mean a long and thin non traversing notch, or indentation.

The groove 50 is delimited by two substantially lateral faces 51A, 51B connected to each other by a lower face 52.

The average distance between the two lateral faces 51A, 51B of the groove 50 defines the width of the groove.

The depth of the groove is defined by the average distance between the lower face 52 of the groove and the plane in which is substantially contained the upper face 41 of the membrane 40.

The transversal profile of the groove 50 then has a substantially U shape.

The groove 50 is at least partly arranged opposite the microchannel 30, thus localised in the central part 43 of the membrane 40.

Thus, the groove 50 brings about a local geometric modification of the membrane 40, and then corresponds to an area of concentration of the mechanical stresses.

Resistive means 60 are arranged in the groove 50, preferably over its entire length.

These resistive means 60 comprise a track 60, or narrow layer, of an electrically conductive material, preferably metallic.

The material of the electrical track 60 has a high coefficient of thermal expansion. Also, it can expand when the electrical track 60 is heated by the presence of an electric current. In the preferred embodiment of the invention, the coefficient of thermal expansion of the material of the electrical track is substantially greater than that of the material of the membrane.

The electrical track 60 fills at least partially the thickness of the groove 50 from the lower face 52 of said groove. It is also in at least partial contact with the lateral faces 51A, 51B.

Figure 4A:
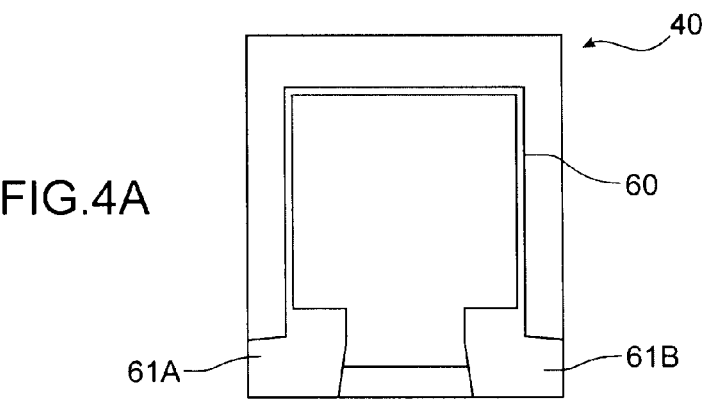
FIGS. 4A to 4C are top views of the membrane of the microfluidic valve according to the invention on which are deposited resistive means, which differ from each other by the pattern formed by the resistive means at the surface of the membrane.
Figure 4B:
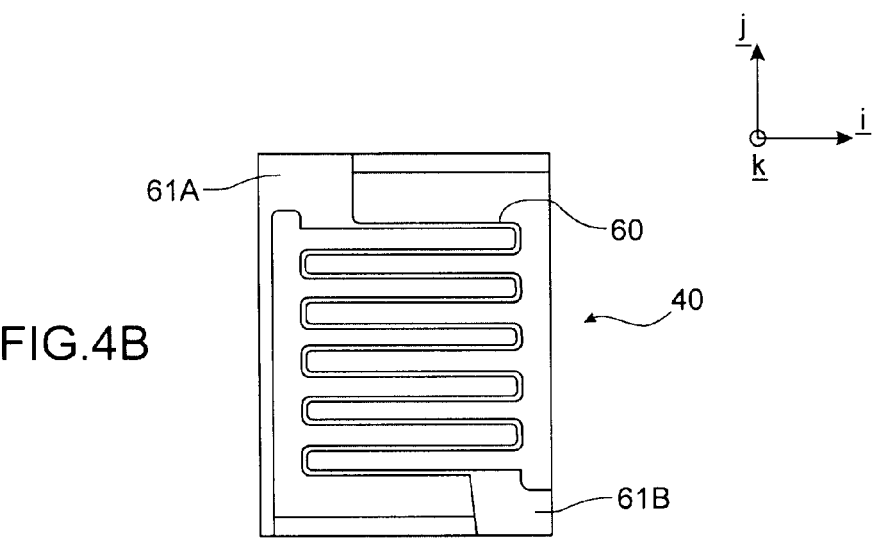
Figure 4C:
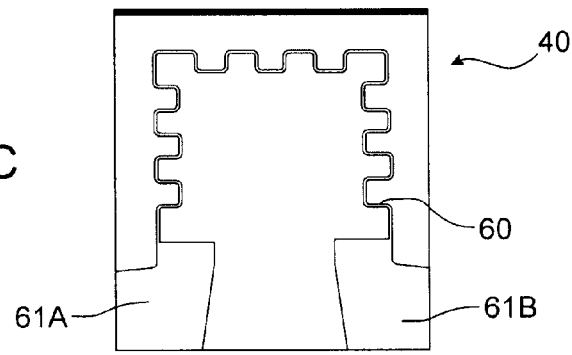

FIG. 4A is a top view of the membrane 40 on which extends the electrical track 60. The electrical track 60 has a pattern along the plane (i,j) of substantially square U shape. Other patterns are possible, such as for example the winding pattern illustrated in FIG. 4B and the fluted U pattern represented in FIG. 4C.

The ends, or terminals, of the electrical track 60 are each connected to an electric connection pad 61A, 61B.

The microfluidic valve 10 also comprises or is connected to a voltage generator (not represented in the figures) connected to said connection pads 61A, 61B. The generator makes it possible to apply a potential difference at the terminals of the electrical track 60.

The operation of the microfluidic valve 10 according to the preferred embodiment of the invention will now be described in detail.

When the voltage generator is activated, a potential difference is applied at the terminals of the electrical track 60.

The potential difference, of the order of several volts, for example 3V, is applied during a time of the order of several tens to several hundreds of microseconds, for example 100 μs.

The electric current is of the order of several tens of milliamperes, for example 50 mA. Also, the electrical energy supplied to the electrical track is then of the order of 0.015 mJ, which corresponds to an electric power of the order of 150 mW.

The electric current then flows through the electrical track 60, and brings about an increase in its temperature.

The electrical track 60 expands proportionally to the increase in temperature. The level of expansion is a function of the coefficient of thermal expansion of the material of the electrical track.

Due to the expansion of the electrical track 60, stresses are applied to the membrane 40, more specifically to the faces of the groove 50, and generate mechanical stresses inside the membrane 40.

More specifically, the expansion of the electrical track 60 in the direction of its width generates tangential stresses on the lower face 52 of the groove 50, which generate shear stresses in the membrane 40, and normal stresses on the lateral faces 51A, 51B of the groove 50 which generate compressive stresses.

Furthermore, the electrical track 60 also emits heat through Joule effect. A part of the heat emitted is transmitted through conduction to the membrane 40, through lateral 51A, 51B and lower 52 faces of the groove 50. A part of the heat emitted, principally that emitted by the upper face 62 of the electrical track 60, is dissipated through radiation and through conduction into the fluid which may be present on the side of the upper face 41 of the membrane 40.

The stresses generated by the expansion of the electrical track 60 cause the rupture of the membrane 40. This takes place essentially at the level of the groove 50, since it forms, on account of its geometry, an area of concentration of stresses.

The defined positioning of the groove 50 in the central part 43 of the membrane 40 thus makes it possible to control precisely the area of rupture of the membrane 40.

Furthermore, the heat transmitted to the membrane 40 through conduction causes an increase in its temperature, mainly near to the groove 50. This increase in temperature can cause an expansion of the membrane 40, according to the coefficient of thermal expansion of the material of the membrane. This expansion induces additional stresses that are added to those generated by the expansion of the electrical track 60. The rupture is then obtained more rapidly, and thus necessitates less cost in terms of electrical energy to be supplied.

The formation of the microfluidic valve 10 will now be described.

The substrate 20 may be made of silicon. The thickness of the substrate 20 depends on the length of the microchannel 30 that it is desired to form. It may be of the order of several hundreds of microns.

A thin film 40 of silicon nitride, intended to form the membrane 40, is deposited on the upper face 21 of the substrate 20, for example by LPCVD (Low Pressure Chemical Vapour Deposition).

The thickness of the thin film 40 is between 50 nm and 1 μm, preferably between 100 nm and 800 nm, and of the order of 200 nm.

The material of the thin film 40, of the amorphous dielectric type, may be, alternatively silicon nitride, SiN or $SiO_2$.

The groove 50 is formed on the upper face 41 of the thin film 40 by photolithography. To do this, a photosensitive resin is spread out on the upper face 41 of the thin film 40 and forms a mask defining the pattern of the groove 50 to be formed.

A step of RIE plasma etching makes it possible to form the groove 50. The groove 50 may have a width of the order of 2 μm and a depth of the order of 100 nm. The groove 50 may be deeper and be of the order of 0.5 to 0.8 times the thickness of the membrane 40.

The electrical track 60, preferably made of gold or platinum, is then deposited by evaporation or sputtering. However, other materials may be used, such as aluminium, manganese, zinc, nickel, inconel 600, chromium, copper and polysilicon. The favoured materials are those in which the coefficient of thermal expansion is greater than that of the material of the membrane. It is advantageous that the thermal capacity is low to favour the production of heat within the electrical track.

Prior to the deposition of the electrical track 60, a thin film of an anchoring material is deposited, for example of thickness of the order of 10 nm. For example, chromium may be used for anchoring gold, and titanium for platinum.

The metal deposited on the resin may be removed by a lift off technique. The resin and the excess metal may then be removed by chemical etching.

Finally, the microchannel 30 is formed, for example, by humid KOH etching of the lower face 22 of the substrate 20, which makes it possible to obtain the membrane 40. Obviously, a protective layer is deposited beforehand on the upper face 41 of the thin film 40.

The etching of the substrate 20 to form the microchannel 30 may be carried out by following the crystalline planes of the substrate 20. The walls 32 of the microchannel 30 are then sloping along an etching angle of the order of 55°.

The end 31 of the microchannel 30 has a substantially square shape of width between 10 μm and 1 mm, preferably between 50 and 500 μm, of the order of 100 μm. The groove 50 is situated, preferably, at a distance of the order of 10 μm from the edge of the end 31 of the microchannel.

The microfluidic valve according to the invention may be used in different types of microfluidic device.

For example, a microfluidic device (not represented) may comprise a reservoir of fluid connect to the microchannel, as well as a second microchannel connected to said first microchannel and separated from it by the membrane.

The fluid may fill the first microchannel and come into contact with the membrane. The lower face of the membrane is then known as upstream face and the upper face of the membrane is known as downstream face. In the case where the fluid is an electrically conductive liquid, it is advantageous that the electrical track is arranged at the level of the downstream face of the membrane, to avoid short circuits.

The second microchannel may be under vacuum. Thus, during the opening of the microfluidic valve according to the invention, the pressure difference between the vacuum and the pressure in the fluid brings about the sucking up of the fluid into the second microchannel.

It is then not necessary to provide for a pressure device to cause the flow of the fluid into the microchannels.

Obviously, various modifications may be made by those skilled in the art to the invention that has just been described, uniquely by way of non limiting examples.

Thus, according to an alternative embodiment, the membrane 40 may be arranged directly inside the microchannel 30, without it being arranged on the upper face 21 of the substrate 20 according to the characteristics of the preferred embodiment described previously. The membrane then comprises a central part that extends into the microchannel along a substantially transversal direction. A peripheral part, fixed to the walls of the microchannel, is present to ensure the holding of the membrane.

A microfluidic device as described previously that comprises a valve according to an alternative embodiment may not comprise any second microchannel. The microchannel 30 may then comprise an upstream part filled with a fluid and a downstream part under vacuum. As described previously, the rupture of the membrane causes the flow of the fluid into the downstream part of the microchannel due to the pressure difference between the vacuum and the pressure in the fluid.

Furthermore, the electric current in the resistive means may be generated directly, as described previously, by direct connection with a voltage generator via conductive pads 61a and 61b. Alternatively, it may be generated at a distance, without any connection, by electromagnetic induction.

In such a case, the resistive means are connected to a conductive closed loop and subjected to a pulsed magnetic or electromagnetic field and activated for the time necessary for the opening of the valve. The pulsed field is provided by conventional means exterior to the system. Its intensity is, preferably, of the order of 0.01 Tesla. The closed loop implanted in the microsystem and connected to the resistive means may comprise just one or several loops (dimensions between 200 to 2000 μm). According to the Maxwell-Faraday law, the induced current is proportional to the frequency of the electromagnetic field, to its intensity, to the dimension of the current loop and inversely proportional to the electrical resistivity of the material constituting the loop(s).

The invention claimed is:

1. A microfluidic valve comprising:
    a substrate;
    a microchannel within said substrate;
    a membrane arranged on said substrate so as to seal off said microchannel, said membrane including a resistive element, and at least one face of said membrane including at least one groove forming a predetermined area of weakness, said groove extending at least in part directly opposite said microchannel,
    wherein said resistive element is arranged in and extends through said groove such that, when an electric control current flows through said resistive element, said resistive element expands due to an effect of heat produced by the flow of said electric control current to cause a rupture of at least one part of said membrane.

2. The microfluidic valve according to claim 1, wherein
    said groove comprises two lateral faces substantially opposite to each other, delimiting a width of the groove, and connected to each other by a lower face, and
    said resistive element is in at least partial contact with said lateral faces and said lower face.

3. The microfluidic valve according to claim 1, further comprising an electric control current source connected to said resistive element.

4. The microfluidic valve according to claim 3, wherein the electric control current source controls current by electromagnetic induction, the electric control current source including a coil connected to said resistive element.

5. The microfluidic valve according to claim 1, wherein
    said resistive element is made of a material having a first coefficient of thermal expansion, and
    said membrane is made of a material having a second coefficient of thermal expansion substantially less than the first coefficient of thermal expansion.

6. The microfluidic valve according to claim 1, wherein said groove has an average depth between 0.2 and 0.8 times an average thickness of said membrane.

7. The microfluidic valve according to claim 1, wherein said resistive element is made of a material chosen among gold, platinum, aluminium, manganese, zinc, nickel, inconel 600, chromium, copper, and polysilicon.

8. The microfluidic valve according to claim 1, wherein said membrane is made of a material chosen among $Si_3N_4$, $SiO_2$, and SiN.

9. The microfluidic valve according to claim 1, wherein said at least one face of the membrane is opposite to said microchannel.

10. A microfluidic device comprising:
    the microfluidic valve according to any one of claims 1 to 9; and
    a reservoir of fluid being connected to said microchannel.

11. A method for opening a microfluidic valve according to any of claims 1 to 9, comprising supplying an electrical energy of about 0.015 mJ to said resistive element.

12. The microfluidic valve according to claim 1, wherein a direction of a depth of said groove extends directly toward said microchannel.

* * * * *